United States Patent [19]
Zuchtriegel

[11] Patent Number: 4,572,989
[45] Date of Patent: Feb. 25, 1986

[54] RAPID-START, LOW-PRESSURE DISCHARGE LAMP OPERATING CIRCUIT

[75] Inventor: Anton Zuchtriegel, Taufkirchen, Fed. Rep. of Germany

[73] Assignee: Patent-Treuhand Gesellschaft fur electrische Glühlampen mbH, Munich, Fed. Rep. of Germany

[21] Appl. No.: 352,781

[22] Filed: Feb. 26, 1982

[30] Foreign Application Priority Data

Mar. 30, 1981 [DE] Fed. Rep. of Germany ....... 3112577

[51] Int. Cl.$^4$ .................... H05B 37/02; H05B 39/04; H05B 41/36
[52] U.S. Cl. ........................... 315/209 R; 315/209 T; 315/DIG. 7
[58] Field of Search ......... 315/209 R, 209 T, DIG. 5, 315/38, 53, 54, DIG. 7

[56] References Cited

U.S. PATENT DOCUMENTS 3,765,391 10/1973 Cook ............................. 315/209 T
4,375,608 3/1983 Kohler ............................ 315/209 R

*Primary Examiner*—William L. Sikes
*Assistant Examiner*—Robert E. Wise
*Attorney, Agent, or Firm*—Frishauf, Holtz, Goodman & Woodward

[57] ABSTRACT

To insure starting of an oscillatory circuit for fluorescent lamp operation oscillating, for example, at about 35 kHz, two transistors are serially connected across the output of a rectifier adapted for connection to an a-c network, and the oscillatory circuit is additionally coupled to one of the a-c terminals of the rectifier, to apply to one of the transistors a triggering voltage which recurs with each undulation of the a-c network. The serially connected transistors each have an emitter resistor, which may be a PTC resistor, to balance currents through the transistors and eliminate unbalancing effects of manufacturing tolerances in the transistors. The PTC resistors additionally have current deviation regulating function. For multiple-lamp operation, oscillation control is derived from auxiliary windings on the ballast resistors and applied to the bases of the respective transistors (T1, T2) through an inductance network which insures spaced commutation or switching of the transistors and prevents overlap of conduction phases thereof.

18 Claims, 3 Drawing Figures

RAPID-START, LOW-PRESSURE DISCHARGE LAMP OPERATING CIRCUIT

Reference to related patents, assigned to the assignee of this invention, the disclosure of which is hereby incorporated by reference:

U.S. Ser. No. 06/193,254, filed Oct. 1, 1980, by the inventor hereof and now abandoned, the continuation of which, Ser. No. 415,413, issued Mar. 20, 1984 as U.S. Pat. No. 4,438,372; U.S. Ser. 352,784, filed Feb. 26, 1982, by the inventor hereof "PROTECTED LOW-PRESSURE DISCHARGE LAMP OPERATING CIRCUIT", now U.S. Pat. No. 4,398,126, issued Aug. 9, 1983.

The present invention relates to a discharge lamp operating circuit, for example to an operating circuit for a fluorescent lamp, capable of use with one or more fluorescent lamps, and which utilizes a self-oscillating push-pull switch having two transistors.

BACKGROUND

The referenced application Ser. No. 06/193,254, of Oct. 1, 1980, by the inventor hereof, discloses a circuit of this type having two similarly poled switching transistors which are connected to bridge the terminals of a direct current supply source. If more than one lamp is operated in such a system, each one of the lamp operating circuits has its own series resonance circuit which is formed by respective ballast inductances and a capacitor. The respective lamp operating circuits and the associated series resonance circuits are connected in parallel.

The referenced application discloses a system which is suitable both for single-lamp as well as for multiple-lamp operation which includes a protective circuit so that, in case of malfunction for example upon non-firing or starting of a lamp, the transistor push-pull switch is disconnected, so that damage to the lamps or to the system is prevented.

The referenced application Ser. No. 06/193,254 further describes a control circuit which triggers the oscillator formed by the ballast inductances and the capacitor, and which includes push-pull connected transistors, so that the series resonance circuit will oscillate reliably as soon as power is connected thereto.

THE INVENTION

It is an object to improve the circuit described in the aforementioned referenced application Ser. No. 06/193,254, suitable both for single-lamp as well as for multiple-lamp operation, by improving the starting and control circuitry for the oscillator.

Briefly, starting of oscillations of the oscillatory circuit is reliably insured by feeding trigger pulses from an alternating current supply network to at least one of the push-pull connected transistors, for example by connecting a coupling capacitor to one of the a-c supply terminals to which the rectifier is connected which provides d-c power for the oscillator.

The system has the advantage that each like-polarity half-wave of the power supply, for example each positive half-wave of the power supply causes triggering of the oscillator circuit, and retains the oscillator circuit in triggered condition for the entire time that alternating current power is connected to the system. Failure to start, or poor starting, is prevented since, if a first starting pulse is insufficient, another one will follow rapidly at power line frequency.

The circuit, in accordance with a feature of the invention, additionally can be linearized by including emitter resistors in the transistors of the oscillator circuit which are so connected that feedback voltages, in push-pull, will appear thereon, so that the transistor operating characteristics will be linearized with respect to each other and will operate symmetrically. Thus, uneven or non-uniform current amplification factors of the transistors, and consequent different states of conduction which otherwise might lead to the decrease in efficiency due to resulting non-symmetrical lamp current, are prevented.

DRAWINGS

Figure 1:
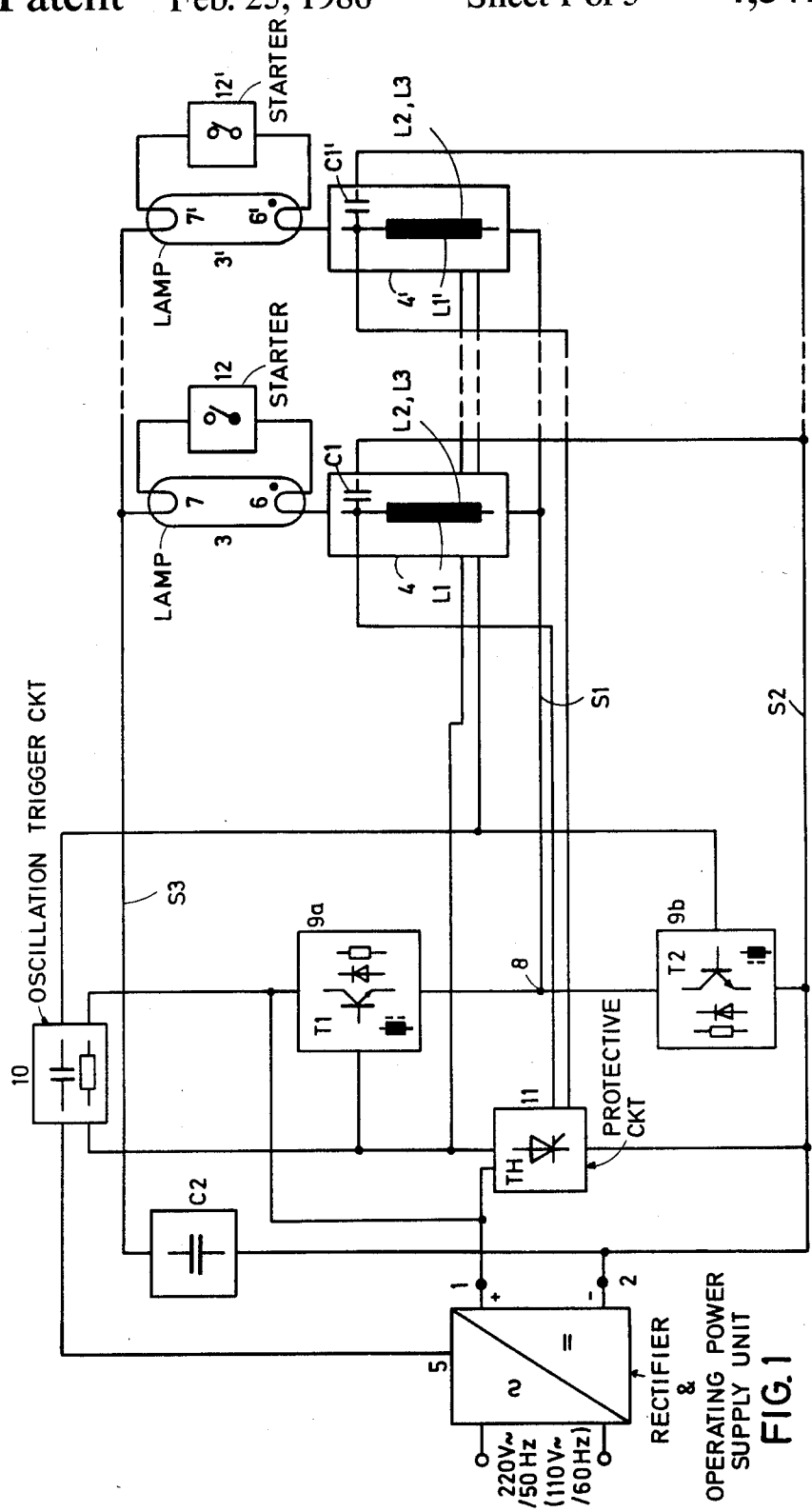
FIG. 1 is a general block circuit diagram of the lamp and circuit system.

Referring to FIG. 1 showing the general principle of the power system for two lamps 3, 3': Terminals 1, 2 provide direct current power. They are connected through the collector-emitter paths of two serially connected similarly poled high-voltage switching transistors T1, T2. The transistor circuit operates as self-oscillating push-pull oscillator to supply power at a frequency substantially elevated above that of power line frequency to low-pressure discharge lamps 3, 3', for example standard fluorescent lamps. Any desired number of lamps may be supplied from the power supply unit upon suitable dimensioning of the components thereof. Each one of the lamps has its own ballast inductance L1, L1' and is coupled to its own individual series resonance circuit 4, 4', which includes the respective inductance L1, L1' and a capacitor C1, C1', respectively. The respective lamp operating circuits and the associated series resonance circuits are all connected in parallel. If only a single lamp is to be operated from the system, only a single accessory circuit 4 with the resonance circuit L1, C1 is associated with the single lamp.

Optimum operation is obtained if the d-c voltage supply has a ripple of not over about 20%. The transistor push-pull circuit formed by transistors T1, T2 is supplied with d-c power from a rectifier 5. The rectifier 5 is connected to any suitable power supply network, for example 220 V/50 Hz or, for example, 110 V/60 Hz. The rectifier 5 preferably is constructed as a bridge rectifier and includes a filter capacitor as well as a network ripple filter. When supplied, for example, with 220 V network voltage, it provides at output terminals 1, 2 a d-c voltage of about $\sqrt{2} \cdot 220$ V. For operation with 110 V/60 Hz, the rectifier preferably includes a symmetrical voltage doubler circuit and, if needed, a filter network to remove network voltage ripple. The transistor push-pull switches T1, T2 apply only half the voltage to the respective lamp operating circuits, with alternating polarity. The series resonance circuits 4, 4' provide a substantially higher voltage to the respective lamps 3, 3', particularly during starting. They also supply a sufficiently high operating voltage for continuous operation of the lamps 3, 3'.

Figure 2:
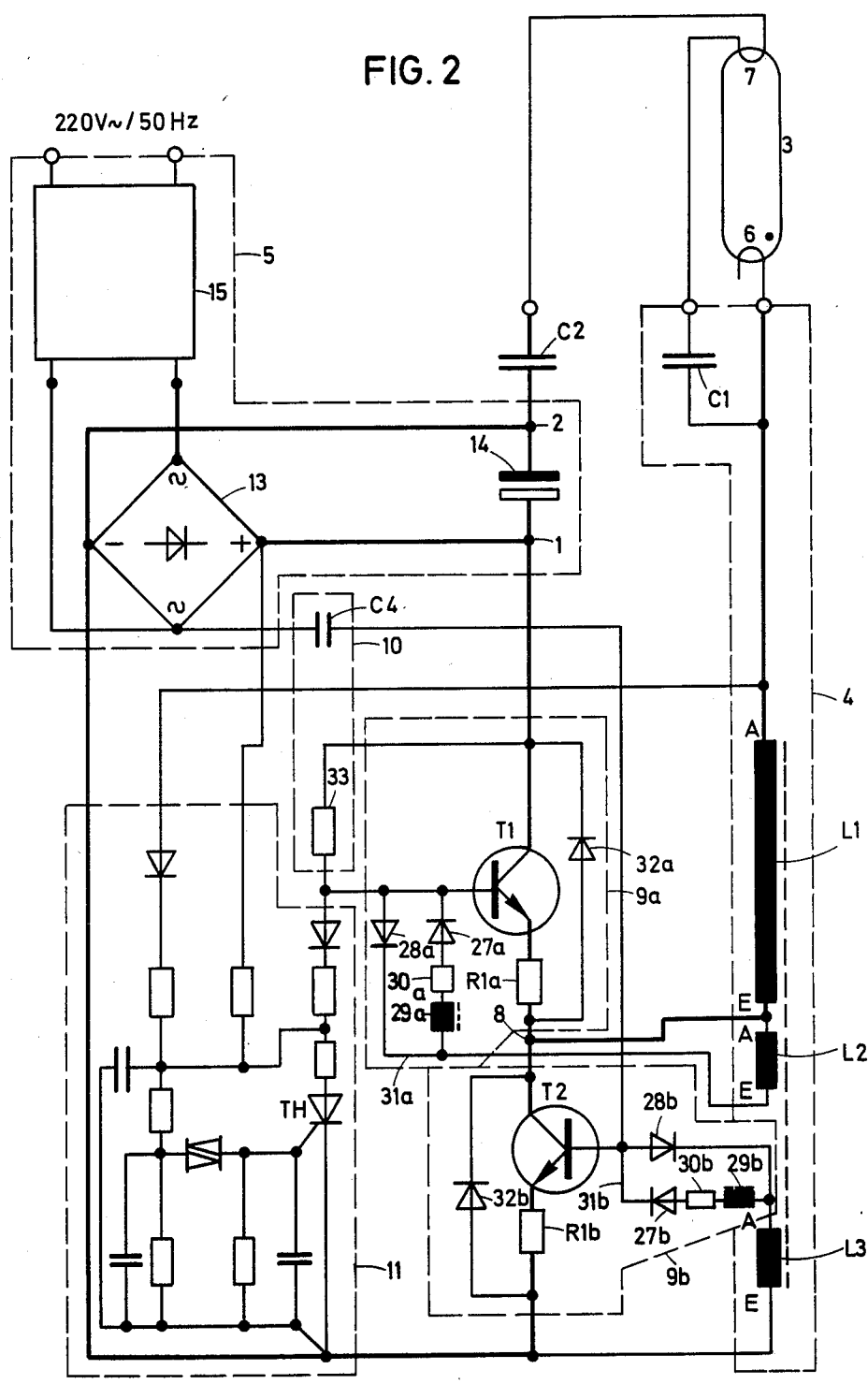
FIG. 2 is a circuit diagram of an embodiment of the invention for single-lamp operation.
Figure 3:
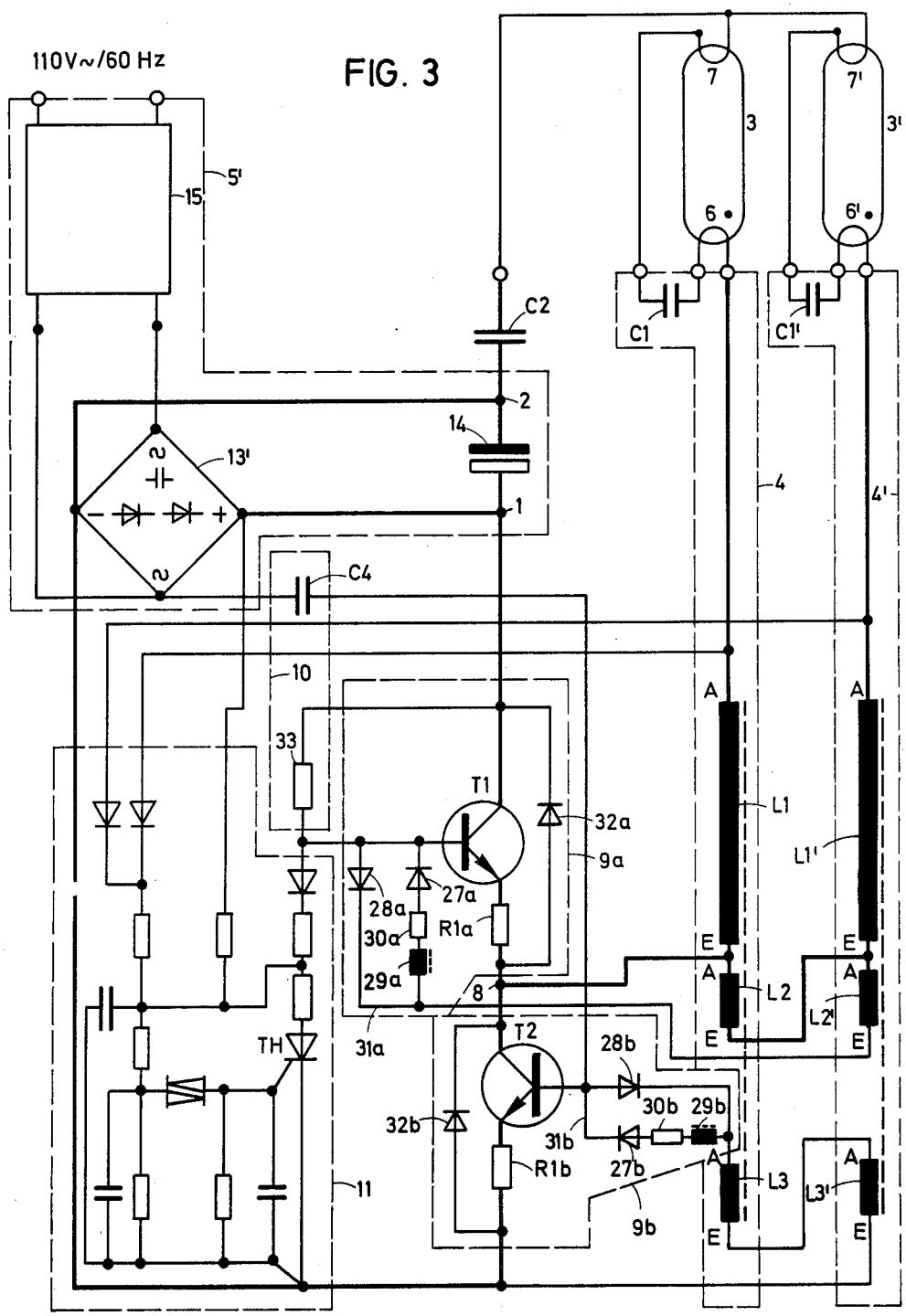
FIG. 3 is a circuit diagram of an embodiment for multiple-lamp operation.

The first electrodes 6, 6' of the lamps 3, 3' are connected through the respective ballast inductances L1, L1' or, rather, the resonant-tuned circuit inductances, to a common supply bus S1 which is connected to the center tap or junction 8 between the two transistors T1, T2 of the push-pull switching system. The electrodes 6, 6' of the lamps 3, 3' are additionally connected to the oscillating capacitors C1, C1' which, in turn, are connected to a common bus S2 which is connected to one terminal as shown to the negative terminal 2 of the d-c supply source formed by the rectifier and operating supply unit 5. The arrangement may be varied, and modified arrangements and positions of the oscillating capacitors C1, C1' are shown in FIGS. 2 and 3, to be described in detail below. The second electrodes 7, 7' of the lamps 3, 3' are connected to a common bus S3, which is in turn connected through a capacitor C2 of relatively high capacity to the aforementioned bus S2, in this case the negative bus of the d-c power supply unit 5. The capacitor C2 has at least 50 times the capacity value of the oscillating capacitors C1, C1'. Consequently, the common bus S3 is practically at center voltage with respect to d-c supply voltage. The lamps 3, 3' are supplied with alternating power of a frequency which is within the audio or high-frequency range. The impedance of the capacitor C2 is extremely low at the operating frequency. The capacitor C2 acts only as a reactive power load or impedance element. The oscillating frequency of the transistor oscillator is determined by the series resonant oscillating circuit 4, 4'. The respective lamps 3, 3' form the damping load for the respective oscillating circuits.

The inductances of the oscillating circuits provide control energy for the switching transistors T1, T2 of the push-pull circuit over additional control windings. Control windings L2, L2', and L3, L3' are inductively coupled with the inductances L1, L1' and connected over a network formed by rapid switching diodes, resistances, and inductances with the bases of the respective switching transistors T1, T2. The control networks for the transistors T1, T2 are shown only schematically in FIG. 1, and collectively by block 9a, 9b.

Starting of the transistor oscillator is effected by a start oscillating circuit 10 which triggers transistor T2, that is, the transistor which is connected to the negative terminal 2 of the power supply, by providing a trigger voltage to the base thereof. When the switching transistor T2 is rendered conductive by a pulse from the trigger circuit 10, the oscillating circuits 4, 4' will start to oscillate, and the feedback currents maintain oscillation of the push-pull oscillator T1, T2.

The operation of the protective circuit 11 is described in detail in referenced application Ser. No. 352,784, by the inventor hereof, filed concurrently herewith, entitled "PROTECTED LOW-PRESSURE DISCHARGE LAMP OPERATING CIRCUIT", now U.S. Pat. No. 4,398,126, issued Aug. 9, 1983.

The series resonance circuits 4, 4' operate stably and with low inherent or internal losses as long as a lamp 3, 3' is connected as a load and absorbs energy. The oscillating circuits 4, 4' must be so damped that the switching transistors T1, T2 are suitably controlled. Upon interruption of a load, for example if a lamp is to be exchanged, the voltage rises rapidly, and substantial losses will result within the accessory apparatus. Unless precautions are taken, the accessory apparatus may be damaged or destroyed. To prevent destruction, a protective circuit 11 is provided which disconnects the transistors T1, T2 rapidly, for example in about 1½ second or less, after an interruption in normal operation occurs. Simultaneously, upon removal of one of the lamps 3, 3', for example, from the lamp socket, disconnection of the transistors T1, T2 prevents dangerously high voltages from occurring at the lamp sockets. The protective circuit 11 includes a controlled switching element TH, for example a thyristor, which is connected in the connection line between the base of the switching transistor T1, that is, the transistor connected to the positive terminal 1 of the d-c operating power supply unit, and the negative terminal 2 thereof.

The present invention is directed to the oscillation trigger circuit 10 and the control circuits 9a, 9b, and will be described below with reference to FIGS. 2 and 3.

The resonance capacitors C1, C1' will have a high voltage when the lamps 3, 3' are not yet ignited or have not yet fired. This high voltage is also the idling voltage for the lamp. Due to this high voltage, the lamps 3, 3' will be of the "rapid-start" type, thus will fire or illuminate without preheating of the electrodes. The lamps, thus, are cold-starting. In order to insure reliable switching, starter switches 12, 12' may be supplied which bridge the lamps 3, 3' when the network voltage is first connected in order to preheat the electrodes 6, 7; 6', 7', as well known. The starter switches 12, 12', after the lamps have been preheated, will open and thus insure firing. The switches 12, 12' may be rapid-switching four-layer diodes, starter switches with a glow element, which have a high glow current, and which prevent ignition of the lamp unless the electrodes 6, 7; 6', 7' have been preheated. Thus, the system can be used both with rapid-start cold-firing, as well as with starter-type lamp circuits. Network arrangements in which by suitable connection of the capacitors C1, C1' permit elimination of the starter switches 12, 12' are shown in FIGS. 2 and 3.

General circuit arrangement of FIGS. 2 and 3: The rectifier and operating power supply unit 5 provides operating power for one (FIG. 2) or two (FIG. 3) fluorescent lamps of 50 W, 1.5 m length, having a firing or ignition voltage of over 800 V. The operating frequency for the lamps is 35 kHz, and each one of the lamps, including accessory equipment, have a power consumption of 56 kw, so that, for two-lamp operation together with the circuits (FIG. 3), 112 W load will be placed on the power network. The rectifier operating power supply unit 5 is shown in FIG. 2 as a bridge rectifier 13 to which a large network filter capacitor 14 is connected. A filter network 15 protects the network against high-frequency and excessively high current peaks or needle pulses. FIG. 3 illustrates a rectifier and operating power supply unit 5', adapted for connection to 110 V/60 Hz, which has a voltage doubler circuit 13', a network high-frequency filter protective circuit 15, and a filter capacitor 14.

FIGS. 2 and 3, further, show different possibilities for connection of the capacitors C1, C1' of the series resonance circuits 4, 4'.

The control windings L2, L2' and L3, L3' are so subdivided that each one of the control circuits has to supply, for n lamps, only the n-th portion of the control energy. Thus, for one-lamp operation (FIG. 2), the entire control energy must be supplied by the coils L2, L3; for multiple-lamp operation, for example two-lamp operation, the windings L2, L2', L3, L3' need supply only ½ or, generally, 1/n of the control energy. The summation of the voltage components optimally should be so high that the switching transistors T1, T2 are controlled into at least quasi-saturation. The control windings L2, L2' and L3, L3' for the respective switching transistors T1, T2 are galvanically separated from each other. If more than one lamp is to be operated—see FIG. 3—the respective inductances L2, L2'; L3, L3' are serially connected in a group of series circuits which bridge the base-emitter path of the respective switching transistor T1, T2. If only a single lamp is used, only the control windings L2 and L3 are coupled with the ballast inductance L1-see FIG. 2.

The control networks 9a, 9b (FIG. 1) of the switching transistors T1, T2 receive their energy from the windings L2, L2' and L3, L3' on the inductances L1, L1', respectively.

The control networks 9a, 9b, connected to the control windings L2, L2' and L3, L3', respectively, each include two counter polarized parallel connected diodes 27a, 28a, 27b, 28b, respectively, which are connected to the bases of the transistors T1, T2. The diodes 27a, 27b, which are polarized in the same direction as current flow to the base of the respective associated transistor is additionally serially connected with a current limiting resistor 30a, 30b and an inductance 29a, 29b. The control circuit for the switching transistors T1, T2 thus includes inductances 29a, 29b which improve the switching conditions thereof. They decrease the slope of voltage rise in the direction of current flow with respect to the slope of voltage drop upon blocking. As a consequence, the transistor, for example transistor T1, will become conductive at a slower rate than the transistor, then transistor T2, which is about to block. Reliable push-pull operation is thus insured.

The circuit arrangement insures switching of transistors T1, T2 in opposition, or push-pull, since minority carriers within the semiconductor crystal are reliably removed from the junction or blocking zone. Upon switching transition or commutation, overlap between blocking and conducting phases of the transistors T1, T2, which might lead to dangerous conditions within the network, are avoided.

The control windings L2, L2' are serially connected in multiple-lamp operation—see FIG. 3—and are further connected with one of the terminals to the emitter-resistor R1a of the transistor T1. The other terminal of the series connection of the coils L2, L2' is connected to the diode circuit 31a at the terminal remote from the base of the transistor T1—see FIG. 3. In single-lamp operation, the single control winding L2 is similarly connected, that is, to the emitter-resistor R1a and to the network 31a at the point remote from the base of transistor T1. The second control winding L3 (FIG. 2), or serially connected control windings L3, L3' used in multiple-lamp operation (FIG. 3) has one end terminal connected to the emitter-resistor R1b of the other transistor T2, and the other end terminal to the respective diode network 31b of the transistor T2. The diode network 31b is, essentially, similar to the diode network 31a of transistor T1.

The emitter-resistors R1a and R1b insure that the transistor switching events occur symmetrically. The resistors R1a, R1b can be identical pure low-temperature coefficient resistors, such as fixed resistors; they may also, however, be positive temperature coefficient (PTC) resistors. PTC resistors have the advantage that they can additionally accept some control function. For example, if a change in loading should occur, which is reflected in the transistor switching currents, higher or lower transistor switching currents, as they flow through a PTC resistor, will cause negative feedback effects, since the resistance value of the PTC resistor will, correspondingly, become greater or less. The PTC resistor is so selected that its normal resistance is the same as that of a pure ohmic resistor when the lamp circuit and system are operating under design conditions. A suitably dimensioned incandescent lamp may function as a PTC resistor.

A rectifier diode 32a, 32b, respectively, is connected across the emitter-resistor R1a, R1b and the collector of the respective transistor T1, T2. These diodes function as free-wheeling diodes and prevent inverse operation of the respective transistors T1, T2. Diodes 32a, 32b accept inverse current flow at the transistion or commutation instants which might occur due to stray inductances in the resonance circuits 4, 4'.

The oscillation trigger circuit 10 includes a capacitor C4 (FIGS. 2, 3) which interconnects the base of the transistor T2 with one of the terminals of the rectofier 5, 5' which carries alternating current. The collector-base path of the transistor T1, connected to the positive terminal of the rectifier unit 5, 5' is bridged by a resistor 33. The resistance value of the resistor 33 can be very high, since the current amplification factor of the transistor T1 will be effective. This has the advantage that losses due to current flowing through the transistor are reduced, so that its dissipating power likewise can be reduced. Such a resistor can be much smaller than a resistor connected, for example, across the collector-emitter path of the transistor T1, which causes more power loss.

In a suitable embodiment, the following values are appropriate: For lamps as aforesaid, transistors T1, T2: high voltage switching transistor, e.g. Motorola: resistors R1a, R1b: each $\phi$0.3 $\Omega$/0.5 W, capacitor C4: 0.015 $\mu$F/400 V, resistors R30a, R30b: each 10 $\Omega$/1 W, inductances 29a, 29b: each 50 $\mu$H/0.5 A, MJE 13007 or Texas Instruments: BU 426.

Various changes and modifications may be made, and features described in connection with any one of the embodiments may be used with any of the others, within the scope of the inventive concept.

I claim:

1. Rapid-start, low-pressure discharge lamp operating circuit, particularly for connection to at least one discharge lamp (3, 3') having a rectifier (5) adapted for connection to an a-c power network, said rectifier having a terminal carrying alternating current, and d-c output terminals (1,2);

a self-excited push-pull oscillator circuit including two serially connected transistors (T1, T2) of the same conductivity type, their collector-emitter paths being connected in series with each other in said oscillator circuit with the same polarity, and the transistors (T1, T2) being connected across the d-c output terminals;

at least one series resonance starting circuit (4, 4') including a ballast inductance (L1, 11') and a capacitor (C1, C1') connected to the at least one lamp, wherein the two serially connected transistors are further coupled to said at least one resonance starting circuit (4, 4') and comprising, in accordance with the invention, means (10) for reliably initiating oscillation of the push-pull oscillator circuit, comprising a circuit connection (C4) coupling at least one of the transistors (T2) to said terminal of the rectifier (5) carrying alternating current;

and two emitter resistors (R1a, R1b), one, each, being respectively coupled to a respective emitter of an associated transistor.

2. Circuit according to claim 1, wherein the transistor which is coupled to said terminal of the rectifier carrying alternating current is tihe transistor (T2) which is connected to the negative terminal (2) of the redundant d-c output terminals (1, 2).

3. Circuit according to claim 1 or 2, wherein said circuit connection of the oscillation trigger circuit (10) includes a capacitor (C4) which is connected to the base of said one of the transistors (T2).

4. Circuit according to claim 3, wherein said circuit connection comprises a coupling capacitor (C4).

5. Circuit according to claim 1 or 2, wherein said circuit connection comprises a coupling capacitor (C4).

6. Circuit according to claim 2, further including a resistor (33) connected across the collector-base path of that one (T1) of the transistors (T1, T2) which is connected to the positive terminal (1) of said d-c output terminals (1, 2).

7. Circuit according to claim 1, wherein said emitter-resistors (R1a, R1b) are ohmic resistors of low temperature coefficient of resistance.

8. Circuit according to claim 1, wherein said emitter-resistors (R1a, R1b) are positive temperature coefficient resistors.

9. Circuit according to claim 1, further including a diode (32a, 32b), each, connected across the collector-emitter path of the respective transistor (T1, T2) and poled in opposite conduction direction to form a freewheeling diode connected across the respective transistor.

10. Circuit according to claim 1, further including a coupling network connecting the at least one ballast inductance with said transistors, said coupling network including
a first coupling inductance (L2, L2') inductively coupled to said ballast inductance (L1, L1'), and having two terminals, one of said inductance terminals being connected to the terminal of the emitter-resistor (R1a) remote from the emitter of the associated transistor (T1), the other terminal of the coupling inductance being connected to a first connection network including a first diode (28a) polarized counter the direction of base-emitter current flow, and to a series connection including a first auxiliary inductance (29a) and a second diode (27a) polarized in the direction of base-emitter current flow of said associated transistor (T1);
and a second coupling inductance (L3, L3') having one terminal thereof connected to the terminal of the emitter-resistor (R1b) remote from the emitter of the other transistor (T2) and having the other second coupling inductance terminal connected to a second connection network connected to the base of the other transistor (T2) and including
a third diode (28b) polarized counter the current flow direction between base and emitter of the associated transistor, and, in parallel thereto, the series connection of a second auxiliary inductance (29b) and a fourth diode (27b) polarized in flow direction of current between the base and emitter of the associated transistor.

11. Circuit according to claim 10, further including a current limiting resistor, each (30a, 30b) serially connected in the series circuit formed by said auxiliary inductance (29a, 29b) and the respective diode (27a, 27b) in series circuit therewith.

12. Circuit according to claim 10, for use with a plurality of discharge lamps (3, 3'), wherein each lamp has associated therewith an individual ballast inductance (L1, L1') and an individual capacitor (C1, C1') to form individual series resonance circuits (4, 4');
and wherein each of one said ballast inductance (L1, L1'has associated therewith an individual first and second coupling inductance (L2, L3; L2', L3');
and wherein said respective first and second coupling inductances associated with and coupled to the respective ballast inductances are serially connected to form first and second auxiliary inductance groups having end terminals respectively connected to the respective emitter-resistor and to the respective connection network.

13. Circuit according to claim 12, wherein the plurali of lamps and the associated series resonance circuits (4, 4') are connected in parallel across said transistors (T1, T2).

14. Circuit according to claim 1, wherein the rectifier (5) comprises a bridge rectifier (13) having a filter capacitor (14) connected thereto.

15. Circuit according to claim 1, wherein the rectifier (5') comprises a symmetrical voltage doubler circuit.

16. Circuit according to claim 1, for use with a plurality of discharge lamps (3, 3'), wherein each lamp has associated therewith an individual ballast inductance (L1, L1') and an individual capacitor (C1, C1') to form individual series resonance circuits (4, 4').

17. Rapid-start, low-pressure discharge lamp operating circuit, particularly for connection to at least one discharge lamp (3, 3') having
a rectifier (5) adapted for connection to an a-c power network, said rectifier having a terminal carrying alternating current, and d-c output terminals (1,2);
a self-excited push-pull oscillator circuit including two serially connected transistors (T1, T2) of the same conductivity type, their collector-emitter paths being connected in series with each other in said oscillator circuit with the same polarity, and the transistors (T1, T2) being connected across the d-c output terminals;
at least one series resonance starting circuit (4, 4') including a ballast inductance (L1, l1') and a capacitor (C1, C1') connected to the at least one lamp,
wherein the two serially connected transistors are further coupled to said at least one resonance starting circuit (4, 4');
and wherein two emitter resistors (R1a, R1b) are provided, one, each, being respectively coupled to a respective emitter of an associated transistor.

18. Circuit according to claim 17, for use with a plurality of discharge lamps (3, 3') wherein each lamp has associated therewith an individual ballast inductance (L1, L1') and an individual capacitor (C1, C1') to form individual series resonance circuits (4, 4').

* * * * *

UNITED STATES PATENT AND TRADEMARK OFFICE
CERTIFICATE OF CORRECTION

PATENT NO. : 4,572,989
DATED : FEB. 25, 1986
INVENTOR(S) : ZUCHTRIEGEL

It is certified that error appears in the above-identified patent and that said Letters Patent is hereby corrected as shown below:

```
Column 7, line 6 (claim 7, line 3) change "tihe" to -- the -
Column 7, line 7 (claim 2, line 4) delete "redundant"
Column 8, line 14 after "L1'" place a   ) .

Column 8, line 23 (claim 13, line 1) change "plurali" to
-- plurality --
```

Signed and Sealed this

Eighth Day of July 1986

[SEAL]

Attest:

DONALD J. QUIGG

Attesting Officer

Commissioner of Patents and Trademarks